United States Patent [19]

Kerger et al.

[11] Patent Number: 5,454,421

[45] Date of Patent: Oct. 3, 1995

[54] DEVICE FOR FILLING AND EMPTYING A GAS BOTTLE

[75] Inventors: Leon Kerger, Helmdange; Paul Kremer, Walferdange, both of Luxembourg

[73] Assignee: Luxembourg Patent Company S.A., Luxembourg

[21] Appl. No.: 183,185

[22] Filed: Jan. 14, 1994

[51] Int. Cl.⁶ ........................................ F16L 37/28
[52] U.S. Cl. .................... 141/18; 141/65; 251/58; 137/907
[58] Field of Search .................. 141/4, 8, 18, 21, 141/65, 66, 347, 348, 349, 350; 251/58, 349, 350; 137/907; 74/89

[56] References Cited

U.S. PATENT DOCUMENTS

| | | | |
|---|---|---|---|
| 4,017,053 | 4/1977 | Wells et al. | 251/58 |
| 4,504,038 | 3/1985 | King | 74/89 |
| 5,037,063 | 8/1991 | Kerger et al. | 141/18 |
| 5,150,741 | 9/1992 | Valy et al. | 141/18 |
| 5,282,496 | 2/1994 | Kerger | 141/18 |

Primary Examiner—Henry J. Recla
Assistant Examiner—Steven O. Douglas
Attorney, Agent, or Firm—Leydig, Voit & Mayer, Ltd.

[57] ABSTRACT

The device is designed for a valve with or without a residual-pressure valve element and is intended to fill the bottle and to create a vacuum therein, optionally through the residual-pressure valve element.

It includes a rotary axial shaft (56) with an eccentric tip (58) intended to lift the residual-pressure valve element by rotation of the shaft (56). The rotation of the shaft (56) is brought about by a pneumatic piston (72) which is automatically actuated by connecting the device to a vacuum pump.

14 Claims, 8 Drawing Sheets

DEVICE FOR FILLING AND EMPTYING A GAS BOTTLE

The present invention relates to a device for filling and emptying a compressed or liquefied-gas bottle and designed to be connected, on the one hand, to a gas reservoir for filling the bottle or to a vacuum pump for completely emptying the bottle and, on the other hand, to a filling and emptying coupling nozzle of a valve of the bottle, the said valve comprising an internal chamber in communication with the said coupling and in which a sliding closure member is housed.

In order to prevent penetration of impurities into empty bottles, which it could be difficult to remove by flushing before filling the bottle again, the bottles are generally prevented, especially for gases which have to have a certain purity, from being completely emptied so as to maintain a residual pressure therein which opposes the penetration of such impurities. For this purpose, there is provided in the body of the valve a valve element which, when drawing off gas, closes automatically under the action of its spring when the pressure of the gases in the bottle falls below a predetermined value.

On the other hand, such a residual-pressure valve element constitutes a handicap for filling the bottles. As a matter of fact, filling is carried out in a combined station enabling the bottles to be emptied under vacuum as well as for them to be filled. The bottles are placed, in groups, for example in a basket containing a dozen bottles, and each of them is individually connected to the installation via a filling and emptying device screwed onto the valve of the bottle. The bottles are first connected to a vacuum pump so as to completely empty them of their residual contents and, when the desired vacuum is reached, they are coupled up to a gas reservoir with a view to filling them.

Now, depending on the design of the residual-pressure valve element, this will prevent either emptying or filling given that it will be stressed in the direction corresponding to its closure. In order to overcome this, various systems have been provided to lock the residual-pressure valve element in an open position. The simplest system is a manual opening system through the filling and emptying device. However, such a system is still at the mercy of human error. For example, the operator may forget to open one valve element, the risk of this being all the greater since the bottles are filled in groups.

One improved system is that proposed in U.S. Pat. No. 5,037,063. This has the merit of being automatic and of no longer requiring manual operations. Indeed, the filling and emptying device is designed so that the residual-pressure valve element is automatically opened by the fact of connecting the filling and emptying device to the valve of the bottle and, as a consequence, of being automatically released and closed by disconnecting the device from the valve. For this purpose, the filling device is provided with a pointed rod which penetrates beneath a conical edge of the skirt of the residual-pressure valve element in order to lift the latter off its seat when the device is screwed onto the valve. In other words, the residual-pressure valve element must be designed as a function of the filling and emptying device.

The purpose of the present invention is to provide an improved device of the type described in the preamble which is also completely automatic, but for which the residual-pressure valve element does not have to be specially designed. An ancillary object of the invention is to provide a device which can be fitted to various types of valves, even to standard valves not having a residual-pressure valve element.

In order to achieve this objective, the present invention proposes a device of the type described in the preamble which is essentially characterized by a shaft housed axially and in a rotary manner in the device and comprising an eccentric tip emerging from the device on the side via which the latter is connected to the valve and in that the said device includes a pneumatic piston which is housed in a sliding manner in a cylindrical chamber and can move in the latter, against the action of elastic means, as a result of connecting the device to a vacuum pump and in that the said piston is connected to the said shaft so that a movement of the piston is converted into a rotation of the shaft.

The tip may consist of a longitudinal spatula with a cross-section in the form of a circular arc, forming the continuation of a cylindrical wall cross-section of the shaft, the end of the said tip lying under the residual-pressure valve element when the device is connected to the valve of the bottle.

Consequently, by connecting the device to the valve of a gas bottle, the tip is automatically located in the operative position beneath the lower edge of the residual-pressure valve element, but without acting on it. When the device is connected up to the vacuum pump, the sliding of the piston causes a rotation of the shaft so that the pivoting of the eccentric tip of the shaft lifts the residual-pressure valve element off its seat. In other words, the suction of the vacuum pump is advantageously used to open the residual-pressure valve element. On the other hand, when passing from the emptying phase to the filling phase, the eccentric tip no longer acts on the residual-pressure valve element but the latter is, nevertheless, held open as a result of the pressure of the filling gas.

According to an advantageous embodiment, the tip is detachable and can be removed from the shaft or be replaced by another tip of different shape or gauge. This enables the device to be fitted to various types of valves with or without a residual-pressure valve element.

In a preferred embodiment, the piston includes a piston rod housed transversely in the device, the axis of the rod being orthogonal in relation to the axis of the rotary shaft, whereas the elastic means are constituted by a tensioned spring between the end of the piston rod and the body of the device.

The rotary shaft may be provided with a radial finger penetrating into a diametral perforation of the piston rod so as to convert the sliding of the piston rod into pivoting of the shaft.

In order to reduce the risk of damaging the free end of the eccentric tip, the shaft preferably consists of two telescopic portions, the portion provided with the tip being able to move axially in relation to the other portion against the action of a spring.

In an advantageous embodiment, the front portion of the rod passes through a hollow rod which can slide axially under the action and against the action of a spring in a fixed cylindrical sleeve and in a fixed bush. The end of this hollow rod includes a front seal which ensures sealing at the bottom of the coupling nozzle onto which the device is screwed. This design enables the device to be fitted to various types of valves which are differentiated by the depth of their coupling nozzles.

Other features and characteristics will emerge from the detailed description of an advantageous embodiment presented below, by way of illustration, with reference to the appended drawings in which.

Figure 1:
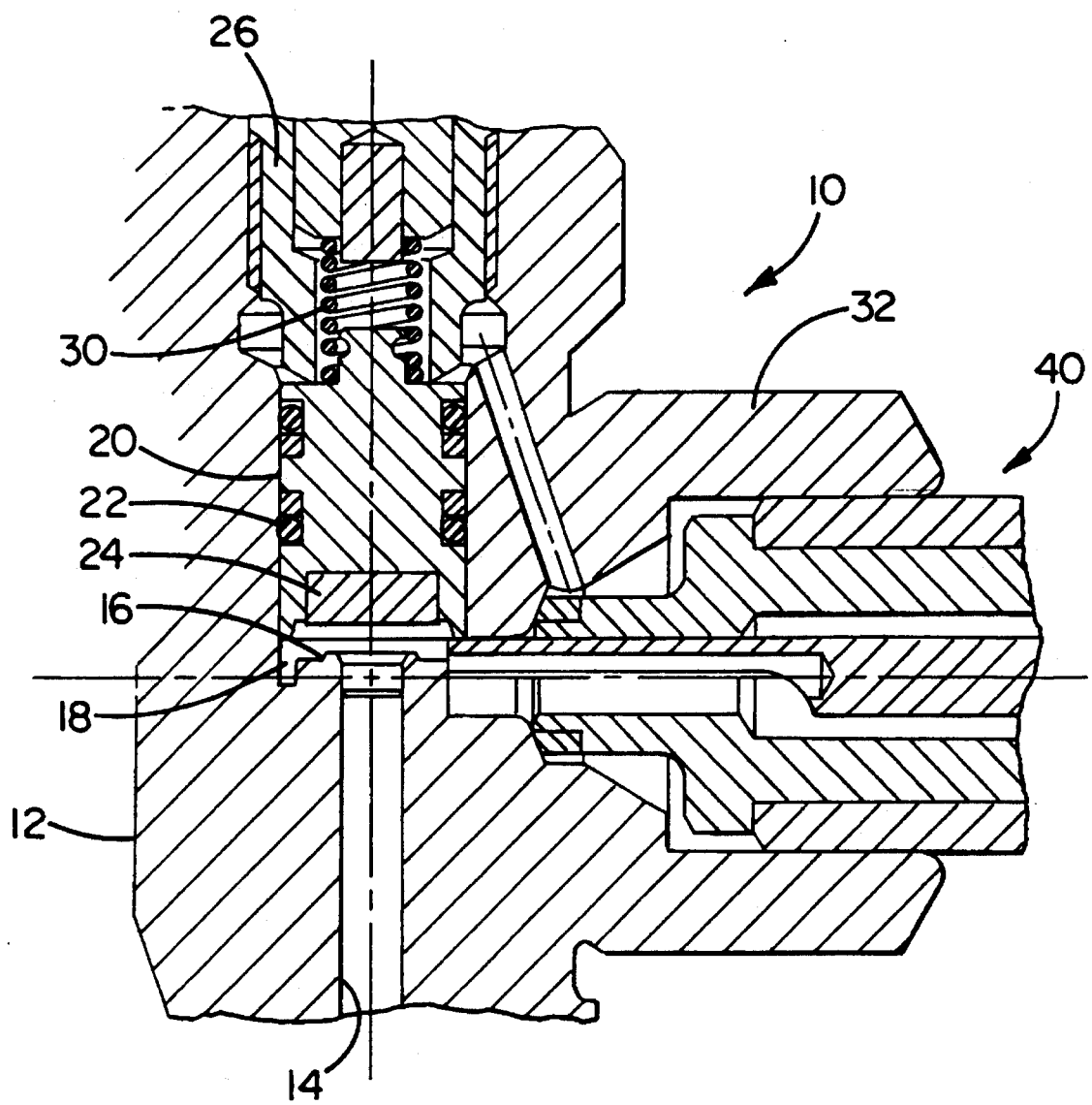
FIG. 1 represents diagrammatically a partial vertical section of a gas-bottle valve with a conventional residual valve element and one end of a first embodiment of a device according to the present invention, intended to be coupled to the valve.
Figure 2:
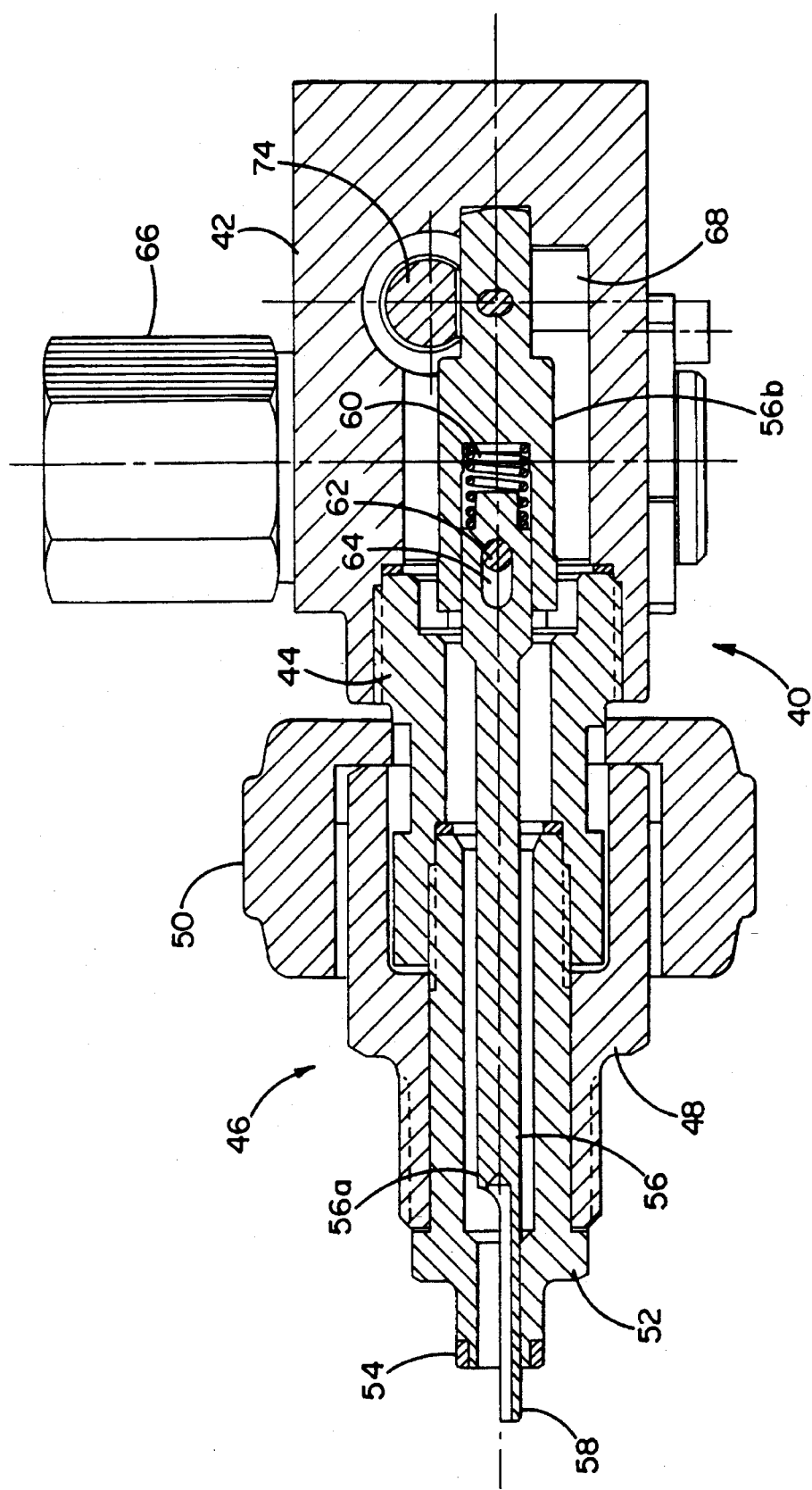
FIG. 2 represents a longitudinal section through the first embodiment of the device according to the present invention.
Figure 3:
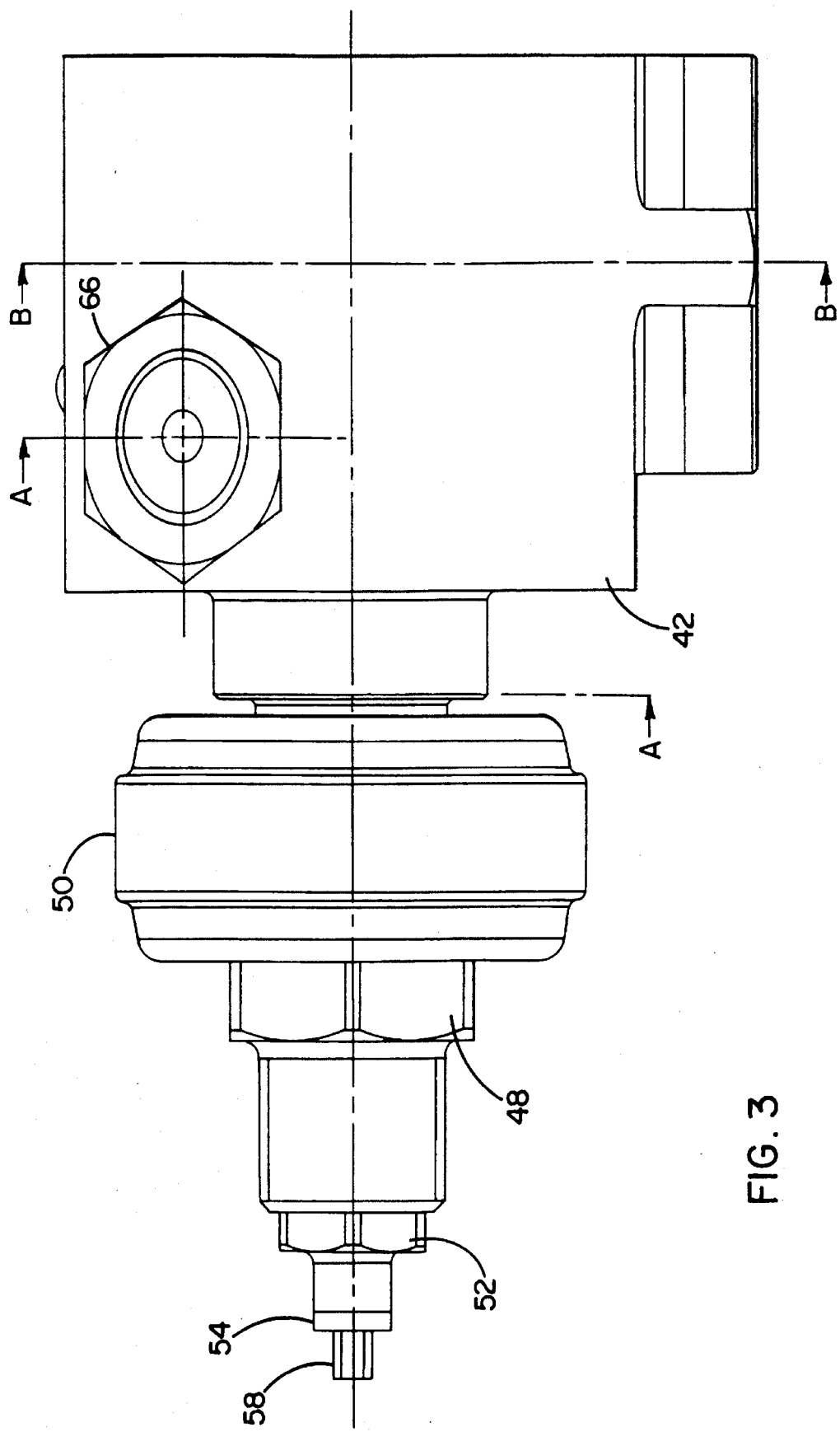
FIG. 3 represents a plan view of this embodiment of the device according to the present invention.
Figure 4:
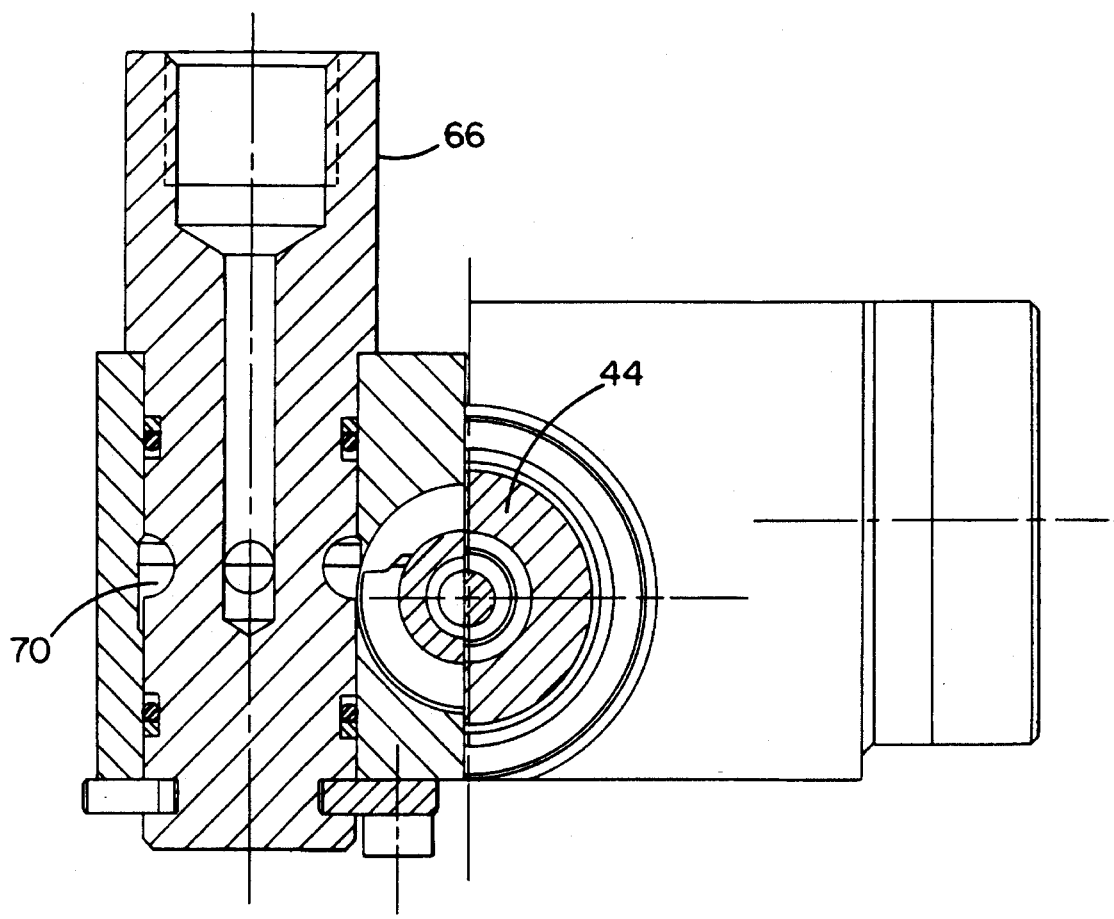
FIG. 4 represents a view in the plane of cutting A—A of FIG. 3.

FIG. 1 represents, in section, a valve 10 consisting of an armature 12 provided with a thread, not shown, enabling the valve 10 to be screwed onto a gas bottle, not shown. The armature includes an axial channel 14 communicating with the inside of the bottle and stopping level with a seat 16 in a cylindrical chamber 18 inside the armature. Housed in the chamber is a cylindrical piston 20 carrying one or more seals 22, for example an O-ring seal ensuring sealing in relation to the walls of the chamber 18. The piston 20 includes a lower sealing disc 24 intended to interact with the seat 16 in order to close the channel 14. Into the upper portion of the armature 12 is screwed an operating member 26 which can be operated by appropriate means for opening and closing the valve. A helical spring 30 is housed between this operating member 26 and the piston 20.

The piston 20 has both the function of a member for closing the valve and the residual-pressure valve element. With a view to closing the valve, the operating member 26 is rotated until the piston is jammed between the lower portion of this member 26 and the seat 16, thereafter preventing gas from leaving. On the other hand, when the operating member 26 is unscrewed, it releases the upper portion of the piston 20 and the pressure of the gas, if it is sufficient, lifts the piston 20 against the thrust of the spring 30. On the other hand, while gas is being consumed, the pressure decreases inside the bottle and when this pressure falls below a predetermined threshold, the force of which corresponds to the force of the spring 30, the latter lowers the piston 20 against the pressure of the gas and closes the channel 14. The piston 20 therefore has the function of a residual valve element insofar as it automatically closes under the effect of the spring 30 in order to prevent the bottle from being completely emptied. Of course, the spring 30 is calibrated as a function of the residual pressure which it is desired to maintain in the bottle.

The valve 10 includes a lateral coupling nozzle 32 communicating with the internal chamber 18 of the valve 10 level with the lower edge of the piston 20. The coupling nozzle 32 includes an internal thread intended to be associated either with a fitting for drawing off gases, of the type described in U.S. Pat. No. 5,037,063, or with a device for filling or emptying a bottle in accordance with the present invention and described in more detail below, with reference to FIGS. 2 to 6.

This filling and emptying device, designated in its entirety by the reference 40, includes a housing 42 connected, via a connection bush 44, to a coupling portion 46. The latter includes a cylindrical coupling 48 engaged, in a rotary manner, on the bush 44 with an external screw thread corresponding to the internal screw thread of the coupling nozzle 32 of the valve 10 so as to be connected to the latter by virtue of an operating wheel 50. The coupling 48 is held in place, in the longitudinal direction, by a tubular part 52 passing through the coupling 48 and screwed into the bush 44. The external portion of the part 52 includes a seal 54 ensuring sealing with the nozzle 32 when the device is screwed onto the latter.

A shaft 56, supported in a rotary manner in the rear wall of the housing 42 and in the tubular part 52, passes axially through the device 40. That portion of the shaft 56 passing through and extending beyond the part 52 is designed in the form of a longitudinal tip 58 which is eccentric in relation to the axis of the shaft 56. This tip 58 may be designed in the shape of a spatula or trough forming the continuation of a wall cross-section of the shaft 56. This tip 58 is housed, when the device 40 is screwed onto the nozzle 32 of the valve 10, under the lower edge of the residual-pressure valve element 20 of the valve 10.

The shaft 56 preferably consists of two portions, a front portion 56a and a rear portion 56b which are engaged telescopically one in the other with inter-position of a spring 60, which confers on the front portion 56a, especially at the tip 58, a certain freedom of axial movement against the action of the spring 60. However, this freedom of movement is limited by a set of stops 62 and an elongate groove 64 which are respectively provided in the rear and front portions of the shaft 56 or vice versa. This design decreases the risk of damaging the tip 58 or the valve 10 by a clumsy operation when coupling the device 40 to the valve.

When rotating the shaft 56 about its longitudinal axis, the tip 58, as a result of its eccentricity, acts on the valve element 20 and lifts it off its seat against the action of the spring 30, which brings the channel 14 into communication with the inside of the device 40. The simplest manner of opening the valve element 20 and of locking it in an open position would be to provide means for being able to rotate the shaft 56 manually. However, this approach would remain subject to the risk of an oversight or an incorrect operation by the operator. For example, if the latter forgets to reposition the shaft 56 in the neutral position, as in FIG. 1, after filling, closing the valve would damage the tip 58 and the valve element 20. This risk is entirely eliminated by virtue of the automatic handling device proposed by the present invention and described in more detail below.

The housing 42 is equipped with a coupling 66 which is intended to be connected to a vacuum pump, not shown, or to a gas reservoir for filling, not shown. For reasons of ease of handling, the coupling 66 can pivot about its axis in relation to the housing 42. Communication through the coupling to an internal chamber 68 in the housing is therefore brought about by axial and radial passages emerging in a circular peripheral groove 70 of the coupling 66.

The inner chamber 68 includes a cylindrical extension 68a in which a sliding pneumatic piston 72 is housed. This piston 72 includes a piston rod 74 which extends transversely in relation to the shaft 56 and which is stressed by a spring 76 so that the piston 72 normally occupies the position illustrated in FIG. 5. The rod 74 of the piston 72 includes a diametral perforation 78 in which a radial finger 80 provided on the shaft 56 is engaged so that sliding of the piston rod 74 is converted into pivoting of the shaft 56 about its longitudinal axis. Of course, it is possible to provide other linkages between the rod 74 and the shaft 56 such as, for example, a rack gear.

Figure 5:
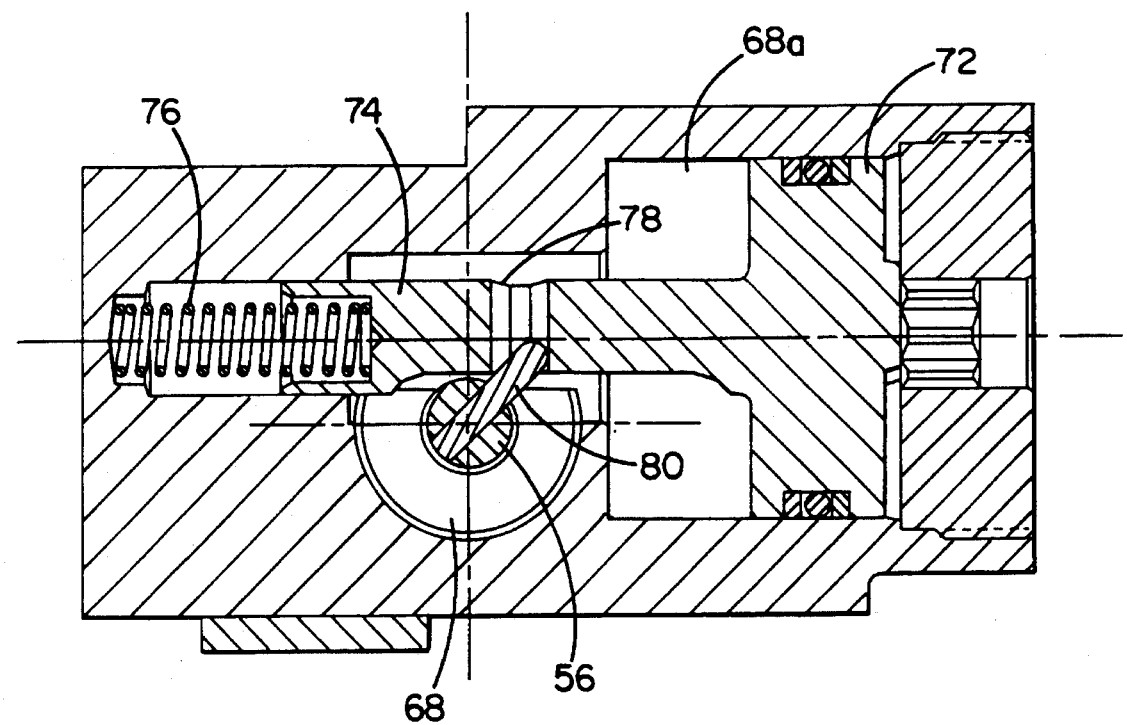
FIG. 5 represents a view in the plane of cutting B—B of FIG. 3.
Figure 6:
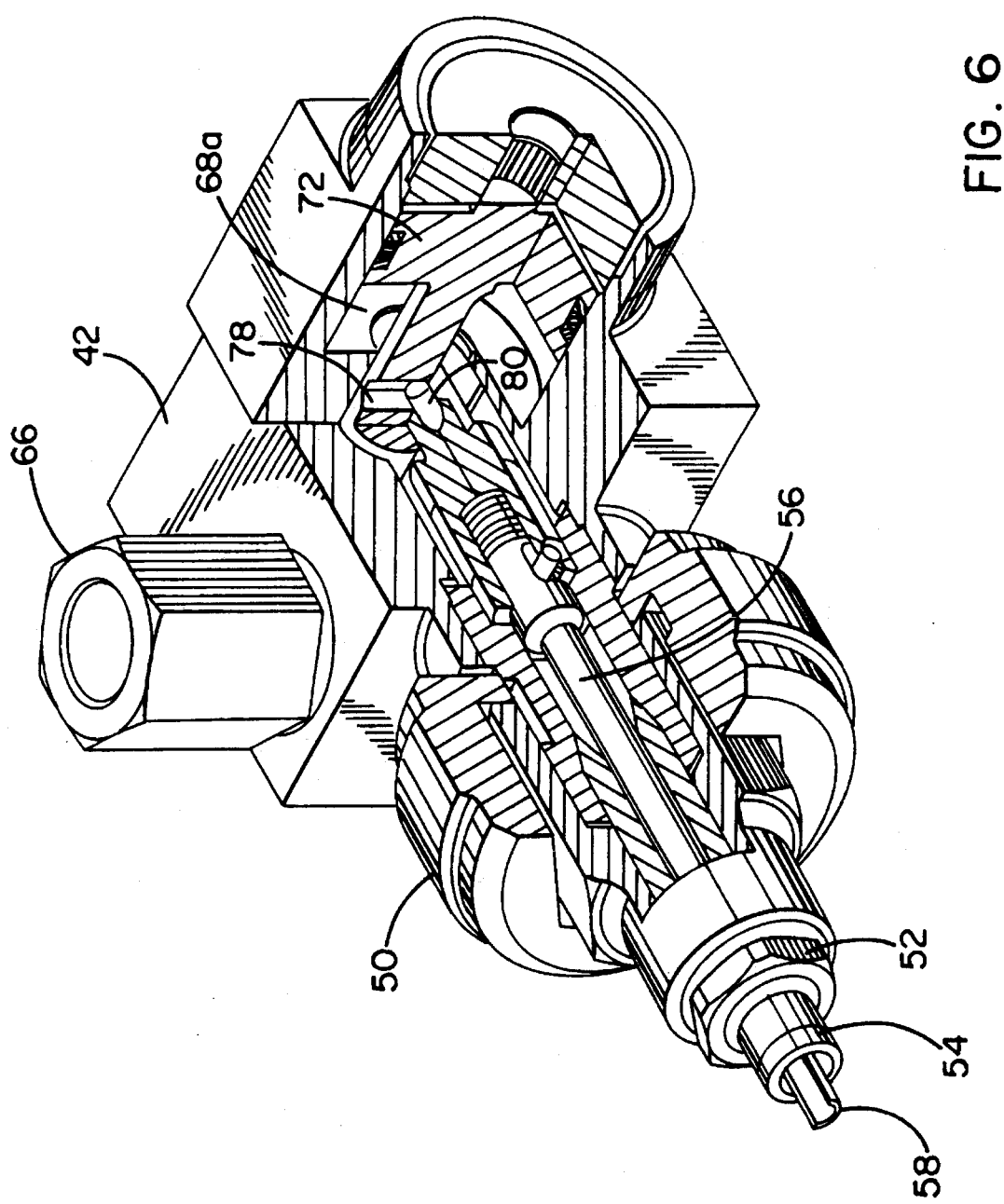
FIG. 6 represents a perspective and partial-sectional view of the first embodiment of this device according to the present invention.

When the device 40 is screwed onto the nozzle 32 of a valve of a gas bottle with a view to filling the latter, the pneumatic piston 72 occupies the position of FIG. 5. Before filling the bottle, the residual gases are extracted by connecting up the coupling 66 to a vacuum pump. The suction of this pump, the effect of which is produced throughout the inside of the device 40, especially in the chamber 68, returns the piston 72 towards the left in FIG. 5, thereby giving rise to a pivoting of the shaft in the trigonometric direction in FIG. 5. This pivoting of the shaft 56 has a crank effect on the tip 58 which is raised and lifts the valve element 20 off its seat against the action of its spring 30, so that the vacuum may propagate into the bottle. As soon as the vacuum in the bottle is sufficient, the coupling 66 is disconnected from the vacuum pump and is connected to a gas reservoir with a view to filling the bottle, which may be performed automatically by switching means, not shown.

As soon as the vacuum pump is disconnected, the pneumatic piston is returned by its spring 76 into the position occupied in FIG. 5, which position it will also keep, thereafter, as a result of the pressure of the filling gas. The residual-pressure valve element 20 is therefore automatically released from the action of the eccentric tip 58. However, the pressure of the filling gas will keep it in the open position throughout the filling phase. When the bottle is full, the valve element 20 is closed with the aid of the operating member 26 and the device 40 may be disengaged from the nozzle 32 in order to be replaced, at the site where the bottle is used, by a fitting for drawing off gas.

Figure 7:
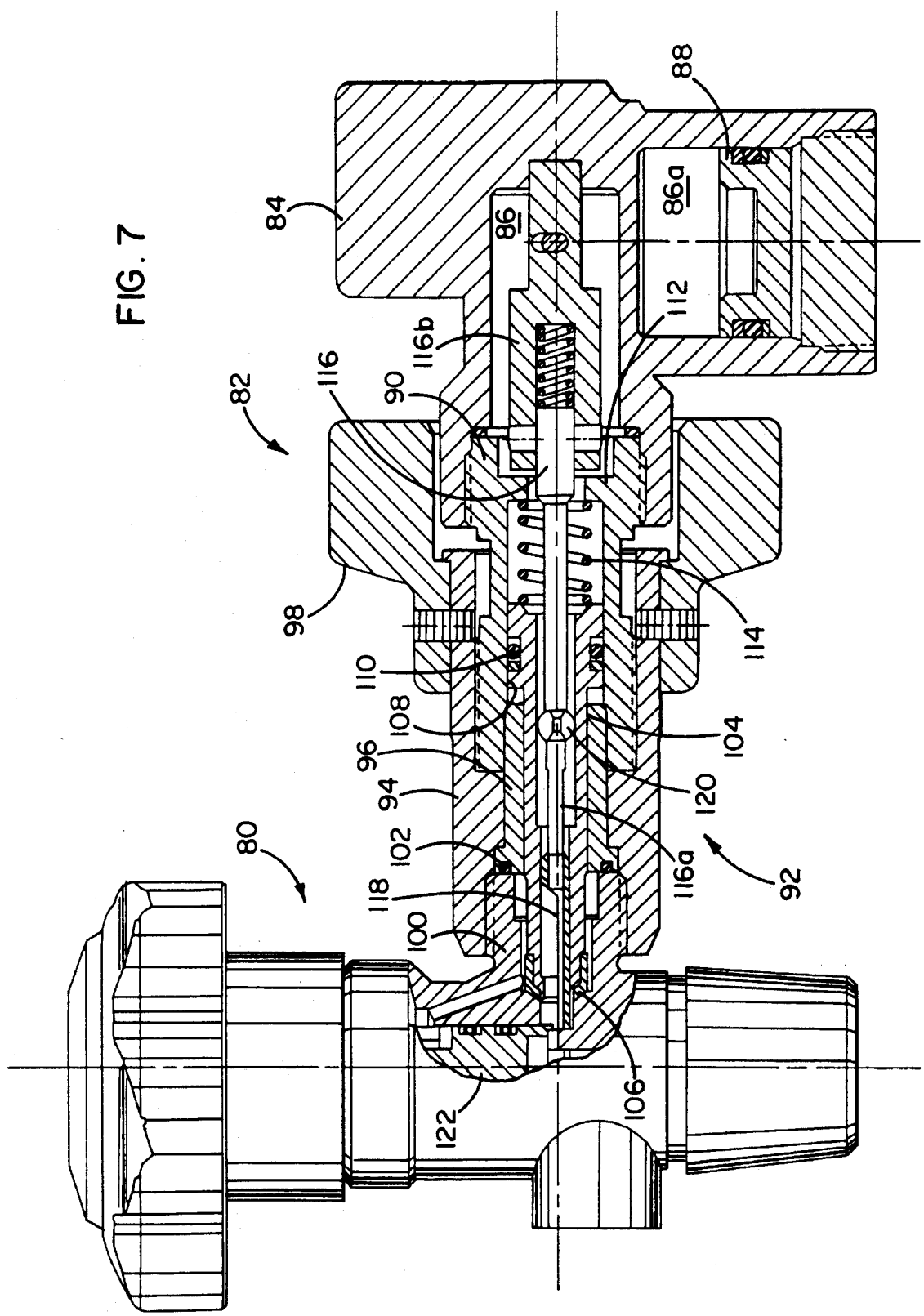
FIG. 7 illustrates a longitudinal section of a second embodiment of a device according to the present invention and FIG. 8 illustrates a longitudinal section of this second embodiment, combined with a standard valve without a residual-pressure valve element.
Figure 8:
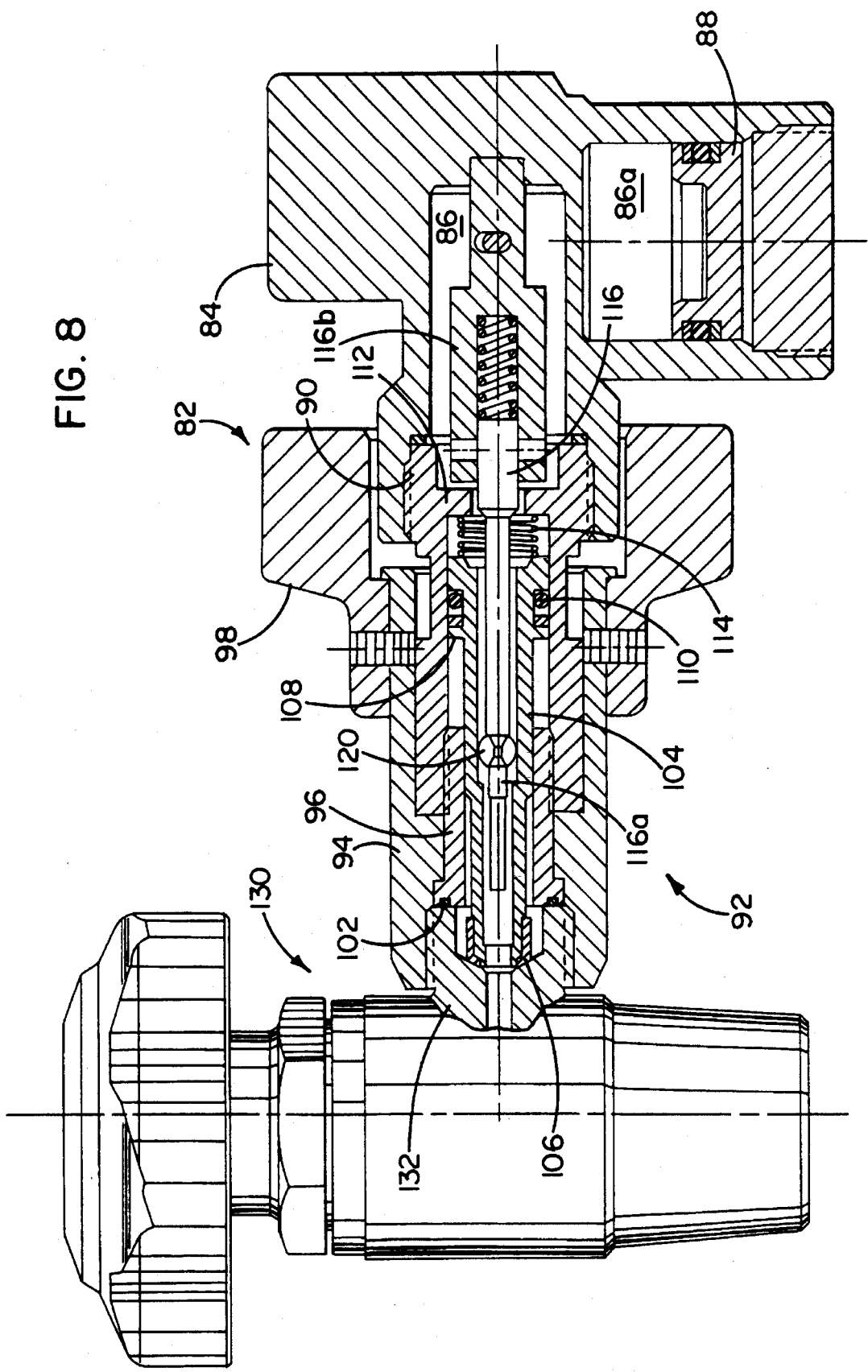

FIGS. 7 and 8 represent a universal filling device which cannot only be fitted to various types of valves with a residual-pressure valve element, but which can also be fitted to standard valves with no residual-pressure valve element.

This device is also based on the general principle of that of FIGS. 1–6 in the sense that it also includes an axial shaft pivoting under the action of pneumatic means. Nevertheless, it includes, in relation to the device described above, a few essential modifications which confer on it this universal character.

The device will now be described with reference to FIG. 7 showing the application to filling and emptying a gas bottle equipped with a valve 80 having a residual-pressure valve element. The device, designated in its entirety by 82, includes a housing 84 with an axial chamber 86 having a lateral cylindrical extension 86a in which a pneumatic piston 88 slides. The housing 84 is also connected, via a connection bush 90, to a portion 92 for coupling up to the valve 80. This coupling portion 92 includes a cylindrical coupling 94 engaged in a rotary manner on the connection bush 90 and held axially in place by a sleeve 96 screwed into the end of the connection bush 90. The coupling 94 is solidly attached to an operating wheel 98 by virtue of which it can rotate freely in relation to the sleeve 96 and to the connection bush 90. The coupling 94 includes, at the opposite end to the bush 90, an internal screw thread corresponding to the external thread of a coupling nozzle 100 of the valve 80 and enabling it to be screwed onto the valve by means of the wheel 98. The sleeve 96 includes a front seal 102 which, contrary to the previous device, does not interact with the inside of the nozzle 100 but with the front face of the latter.

A hollow rod 104 is housed in a sliding manner in the sleeve 96. This rod 104 emerges from the device and, when the latter is connected to the valve 80, penetrates inside the nozzle 100 and is applied in a sealed manner to the latter by virtue of a front seal 106. The end of the rod 104 opposite that of the seal 106 includes a cylindrical enlargement 108 with a peripheral seal 110 and can slide axially in a sealed manner inside the connection bush 90 between the internal edge of the coupling 96 and an internal peripheral shoulder 112 of the connection bush 90. A helical spring 114 is tensioned between the base of the cylindrical enlargement 108 of the rod 104 and the shoulder 112, and forces the rod 104 axially towards the outside so as to apply this rod 104, still in a sealed manner, against the bottom of the nozzle 100, irrespective of the depth of the latter.

As in FIGS. 1–6, the shaft 116, supported in a rotary manner in the housing 84 and consisting of two telescopic portions, a front portion 116a and a rear portion 116b, also passes axially through the device. The rear portion 116b is stressed in the same manner as in the previous embodiment by the pneumatic piston 88 so that the shaft 116 can pivot about its longitudinal axis.

The front portion 116a extends axially through the shoulder 112 of the bush 90, through the spring 114 and the hollow rod 104, and its tip 118, emerging from the hollow rod 104, engages under the action of the spring between the two telescopic portions 116a and 116b under the edge of the residual-pressure valve element 122 in the valve 80. In order to ensure intermediate support of the front portion 116a of the shaft 116, the latter includes a series of radial fins 120 enabling it to rotate and to slide axially in the hollow rod 104 without disrupting the passage of the gases through the latter.

The operation of the device 82, when it is fitted onto the valve 80, is identical to that of the previous embodiment. When draining the gas bottle, the vacuum sucks on the piston 88, the movement of which causes the shaft 116 to pivot about its longitudinal axis and the pivoting of the off-axis tip 118 lifts the residual-pressure valve element and opens the communication with the inside of the bottle. When filling the bottle, the shaft 116 remains in an inactive position, the pressure of the filling gas being sufficient to keep the residual-pressure valve element in the open position. Moreover, by virtue of the cylindrical enlargement 108 of the rod 104, the pressure of the filling gas exerts a differential force on the rod 104, which is added to the force of the spring 114, so that sealing is completely ensured at the seal 106.

On the other hand, and contrary to the previous embodiment, the tip 118 is detachable and is simply engaged by sliding on the end of the front portion 116a of the rod 116. This makes it possible to replace a worn tip easily or to use several tips of different shapes or gauges enabling the device to be fitted to valves of different types. In order to prevent rotation of the tip 118 in relation to the front portion 116a of the rod, their portions which mutually engage, one in the other, preferably have a polygonal cross-section.

It goes without saying that the design having a detachable tip and/or having several exchangeable tips can also be fitted to the device 40 of FIGS. 1–6.

The device 82 is also suitable for filling or draining a bottle equipped with a standard valve without a residual-pressure valve element. FIG. 8 represents such a standard valve 130 connected to the device 82. In order to screw the latter onto the coupling nozzle 132 of the valve 130, all that is required to be done is simply to remove the tip 118, given that the shaft 116 remains inactive during the operation with the valve 130 since the latter does not include a residual-pressure valve element. FIG. 8 also reveals the role of the intermediate support 120 of the shaft 116 which is no longer supported at the front, the tip having been removed. Likewise, FIG. 8 illustrates the reasons for the sliding mounting of the hollow rod 104. Since the internal depth of the coupling nozzle 132 of the valve 130 is less than that of the coupling nozzle 100 of the valve 80, the hollow rod 104 is pushed back toward the inside of the device against the action of the spring 114.

We claim:

1. A device for filling and emptying a compressed or liquefied-gas bottle and adapted to be connected, on the one hand, to a gas reservoir for filling the bottle or to a vacuum pump for completely emptying the bottle and, on the other hand, to a coupling nozzle of a valve of the bottle, the valve comprising an internal chamber in communication with the coupling nozzle and further comprising a sliding closure member housed in the internal chamber, said device including a housing having a side located adjacent the valve and adapted to be connected to the valve, a shaft supported for rotation in said housing, said shaft having a tip positioned eccentrically with respect to the shaft and extending out of said one side of said housing, said housing including a chamber, a piston slidable in said chamber, spring means in said chamber and acting against said piston, said piston being slid in a direction to load said spring means when said chamber is connected to a vacuum pump, and means connecting said piston to said shaft for converting sliding movement of said piston into rotational movement of said shaft.

2. A device according to claim 1, in which said sliding closure member is a residual-pressure valve element, said shaft being generally cylindrical, said tip comprising a longitudinal spatula having an arcuate portion forming a continuation of said shaft.

3. A device according to claim 2, in which said shaft comprises first and second slidably telescoped sections, Said tip being connected to said first section, and a spring biasing said first section axially away from said second section.

4. A device according to claim 3, in which said tip is slidably connected to said shaft and may be selectively detached from the shaft.

5. A device according to claim 1, in which said piston includes a piston rod, the axis of said rod being orthogonal with respect to the axis of said shaft, said spring means comprising a spring acting between said piston rod and said housing.

6. A device according to claim 5, in which said connecting means comprise a radially extending opening in said piston rod, and a radially extending finger on said shaft and projecting into said opening so as to convert sliding movement of said piston into rotational movement of said shaft.

7. A device according to claim 5, further including a hollow rod slidably supported in said housing and having an end portion projecting from said housing, said shaft having a portion located in said rod, a spring in said housing and biasing said rod in a direction to cause said end portion to project from said housing and into the valve when said housing is connected to said valve, and a seal on said end portion of said rod and sealing within said valve when said housing is connected to said valve.

8. A device according to claim 7, further including a sleeve in said housing and slidably supporting said hollow rod, and a seal on said sleeve and sealing against the coupling nozzle when said housing is connected to the valve.

9. A device according to claim 7, further including a plurality of angularly spaced and radially extending fins on said shaft and supporting said shaft within said hollow rod.

10. A device according to claim 1, in which said shaft comprises first and second slidably telescoped sections, said tip being connected to said first section, and a spring biasing said first section axially away from said second section.

11. A device according to claim 1, in which said tip is slidably connected to said shaft and may be selectively detached from the shaft.

12. A device according to claim 1 further including a hollow rod slidably supported in said housing and having an end portion projecting from said housing, said shaft having a portion located in said rod, a spring in said housing and biasing said rod in a direction to cause said end portion to project from said housing and into the valve when said housing is connected to said valve, and a seal on said end portion of said rod and sealing within said valve when said housing is connected to said valve.

13. A device according to claim 12 further including a sleeve in said housing and slidably supporting said hollow rod, and a seal on said sleeve and sealing against the coupling nozzle when said housing is connected to the valve.

14. A device according to claim 12, further including a plurality of angularly spaced and radially extending fins on said shaft and supporting said shaft within said hollow rod.

* * * * *